(12) United States Patent
Reinhart et al.

(10) Patent No.: US 6,553,758 B2
(45) Date of Patent: Apr. 29, 2003

(54) FREEWHEEL UNIT, ESPECIALLY FOR THE STATOR OF A HYDRODYNAMIC TORQUE CONVERTER

(75) Inventors: Edgar Reinhart, Hofheim (DE); Dietrich Bechmann, Röthlein (DE); André Meyer, Schweinfurt (DE); Friedrich Schramm, Schonungen-Frost (DE); Christoph Sasse, Schweinfurt (DE); Erwin Wack, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 51 days.

(21) Appl. No.: 09/828,527

(22) Filed: Apr. 6, 2001

(65) Prior Publication Data
US 2001/0027649 A1 Oct. 11, 2001

(30) Foreign Application Priority Data
Apr. 10, 2000 (DE) .......................... 100 17 744

(51) Int. Cl.[7] ............................................. F16D 33/00
(52) U.S. Cl. ....................................................... 60/345
(58) Field of Search ................................... 60/345, 341

(56) References Cited

U.S. PATENT DOCUMENTS

| 5,729,976 A | * | 3/1998 | Murata et al. ................. 60/345 |
| 5,855,263 A | * | 1/1999 | Fergle .......................... 60/345 |
| 5,918,461 A | * | 7/1999 | Bacon .......................... 60/345 |

FOREIGN PATENT DOCUMENTS

WO      WO 91/16553      10/1991

* cited by examiner

Primary Examiner—Edward K. Look
Assistant Examiner—Michael Leslie
(74) Attorney, Agent, or Firm—Cohen, Pontani, Lieberman & Pavane

(57) ABSTRACT

A freewheel unit intended especially for the stator of a hydrodynamic torque converter, allows first and second elements to rotate relative to each other around a rotational axis essentially in only one direction. A locking element carrier extends in the circumferential direction around the rotational axis and comes at least one first locking element which extends away from this carrier toward the first element in a first circumferential direction. At least one first locking element can come to rest against at least one blocking surface provided on the first element to prevent any relative rotation between the first element and the locking element carrier in one direction of relative rotation.

11 Claims, 3 Drawing Sheets

FREEWHEEL UNIT, ESPECIALLY FOR THE STATOR OF A HYDRODYNAMIC TORQUE CONVERTER

BACKGROUND OF THE INVENTION

1. Field of the Invention

The present invention pertains to a freewheel unit which is intended especially for the stator of a hydrodynamic torque converter and which allows two elements to rotate with respect to each other around an axis of rotation in essentially only one direction.

2. Description of the Related Art

Freewheel units of this type are used, for example, to connect the outer area of the stator in a hydrodynamic torque converter to a support element such as a support shaft. Through the use of these types of freewheel units, it is ensured that the stator or the area of the stator which carries the vanes is supported so that it can rotate in one relative direction while being prevented from rotating in the other direction.

WO 91/16553, for example, discloses a freewheel with a plurality of pawls which are carried on one of the two elements which can rotate relative to each other, and are free to pivot. The pawls have locking sections which can come to rest against blocking surfaces on the other elements when these other elements try to rotate in the blocked direction. It is also known that ball elements can be used to produce a wedge-like blocking action when the two elements try to rotate with respect to each other in the unallowed direction of relative rotation.

All these freewheel units consist of a large number of separate elements, which must be put in place individually during the assembly process. This means that a great deal of work is required to produce such units.

SUMMARY OF THE INVENTION

It is the object of the present invention to make available a freewheel unit which is intended especially for use with the stator of a hydrodynamic torque converter and which is of simple design but nevertheless offers a reliable blocking action.

According to the invention, the freewheel unit allows two elements to rotate relative to each other around a rotational axis essentially in only one direction. This unit includes a locking element carrier, extending in the circumferential direction around the rotational axis, and at least one locking element, which is carried on the locking element carrier and which extends away from this carrier in a first circumferential direction and toward a first side, where at least one blocking surface is provided on the first of the two elements, against which at least one locking element can come to rest to prevent any relative rotation between the first element and the locking element carrier in one direction of relative rotation.

In the freewheel unit according to the invention, therefore, the locking element carrier, which carries at least one locking element, is offered as a complete assembly, so that the work of inserting a plurality of separate locking or latching elements and fastening them in place is no longer necessary.

So that the freewheel unit according to the invention can provide a similarly reliable blocking function with respect to the second of the two elements, this unit also comprises at least one second locking element, which is carried on the locking element carrier, and which extends away from the carrier in a second circumferential direction essentially opposite the first circumferential direction and toward a second side essentially opposite the first side, where at least one second blocking surface is provided on this second of the two elements, against which at least one second locking element rests or can come to rest to prevent any relative rotation between the locking element carrier and the second element in one direction of relative rotation. In this case it is also advantageous for the first blocking surface, of which there is at least one, and the second blocking surface, of which there is also at least one, to be freely exposed so that they can interact with the first locking element, of which there is at least one, and the second locking element of which there is also at least one, in essentially opposite circumferential directions.

So that the load can be distributed uniformly in the circumferential direction during the transfer of torque, it is proposed that first and second locking elements be provided in alternation with each other in the circumferential direction on the locking element carrier. To prevent any undesirable or undefined shifting in the position of the locking element carrier, furthermore, it is also especially advantageous for this carrier to be fastened to one of the two elements.

A highly reliable locking effect can be obtained by designing the locking element carrier essentially in the form of a ring. For example, it is possible to provide a locking element carrier which is essentially in the shape of a cylinder or a section of cylinder, from which the first locking elements extend away radially toward the outside. It is in this case also advantageous for the second locking elements to extend away from the locking element carrier radially toward the inside.

In an alternative design, it is possible to provide a locking element carrier which is essentially in the form of a ring-shaped disk or section of a ring-shaped disk, from which the first locking elements extend toward a first axial side. In this type of design, it is then possible according to the invention to provide in addition that the second locking elements extend away from the locking element carrier toward a second axial side essentially opposite the first axial side.

So that the constructive design can be simplified even further, it is proposed that the locking element carrier be made of sheet metal together with the locking elements, which are formed as integral parts of the carrier. It can then also be provided that the first locking element, of which there is at least one, and/or possibly the second locking element, of which there is also at least one, are bent away from the locking element carrier toward the first and second sides, respectively, The present invention also pertains to a hydrodynamic torque converter which has a freewheel unit according to the invention, where a plurality of guide vanes is supported on the radially outside area of the first of the two elements, and where the second of the two elements is supported nonrotatably with respect to a support element.

It can also be provided that the first element is supported on the second element so that it is free to rotate in the axial direction and/or in the radial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
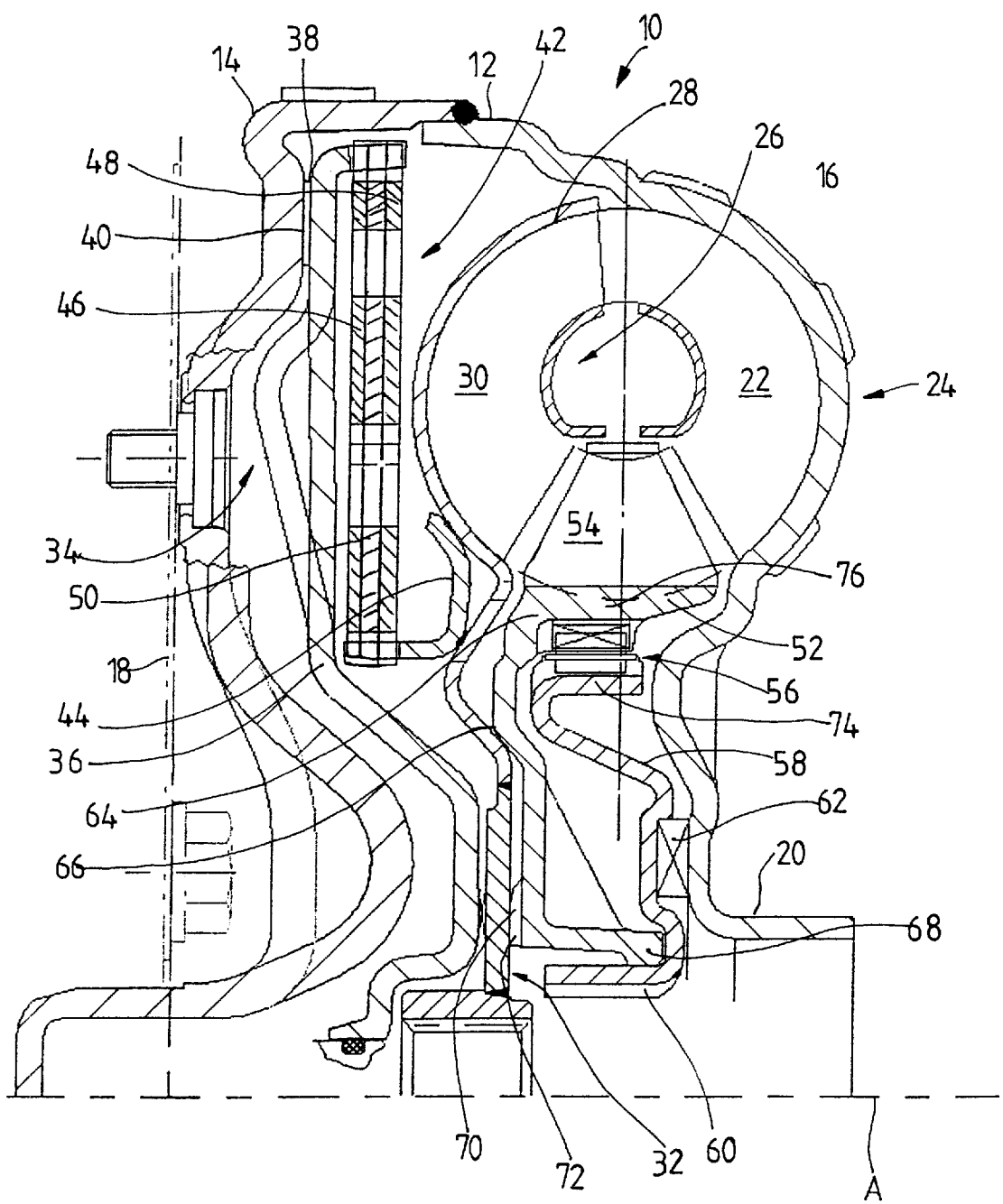
FIG. 1 shows a partial longitudinal cross section through a hydrodynamic torque converter.

FIG. 1 shows a hydrodynamic torque converter 10 according to the invention, which includes a housing unit 12, which consists in turn of an impeller wheel shell 16 connected to a cover 14 in the outer radial region by welds or the like. The housing cover 14 is connected or can be connected nonrotatably to a drive shaft (not shown) via a clutch device 18, and the impeller wheel shell 16 is designed in its radially inside area as an integral part of an impeller wheel hub 20. In addition, the impeller wheel shell 16 also carries in its radially outside area a plurality of impeller filler wheel vanes 22, where ultimately the impeller wheel shell 16, together with the integral impeller wheel hub 20 and the impeller wheel vanes 22, forms an impeller wheel 24. In the interior of the torque converter 10, furthermore, a turbine wheel 26 is provided. This comprises a turbine wheel shell 28, which carries a plurality of turbine wheel vanes 30 on its radially outside area, and which is connected permanently in its radially inside area to a turbine wheel hub 32. The turbine wheel hub 32 can be connected to a power take-off shaft such as the transmission input shaft, so that the hub can rotate in common with it.

The hydrodynamic torque converter 10 also includes a bridging clutch unit 34 having a clutch piston 36, the radial inner area of which is guided with freedom of axial movement on the drive shaft (not shown). The area radially toward the outside carries a friction coating 38, etc., by which the piston can be pressed against an opposing friction surface 40 of the housing cover 14. In addition, the clutch piston 36 is permanently attached by a connecting device 42, designed as a torsional vibration damper, to the turbine wheel 26 or to the driver element 44 attached to it. The torsional vibration damper can have an elastic element in the form of, for example, a helical spring or a similar type of elastic area 46, the radially outer, ring-shaped connecting area 48 of which is attached to the clutch piston 36, whereas the radially inner ring-shaped connecting area 50 is attached to the driver element 44.

A stator 52 is situated axially between the turbine wheel 26 and the impeller wheel 24. The stator 52 carries a plurality of stator vanes 54 on its radially outward area and is carried via a freewheel unit 56 on a support element such as a support shaft (not shown), which is coaxial to the impeller wheel hub 20. The freewheel unit 56 has the job of ensuring that the stator 52 and thus the stator vanes 54 attached to it can rotate freely in only one direction but are prevented from rotating in the other direction.

An internal freewheel element 58 has a set of teeth 60 on its radially inward, cylindrical area, these teeth being designed to engage nonrotatably with the support element (not shown). The internal freewheel element is also supported axially against the impeller wheel shell 16 by a bearing unit 62. The stator 52, with is body section 64, ultimately forms an external freewheel element 66, the inside radial area of which is centered and supported on the internal freewheel element 58, both axially and radially, by a support section 68. This external freewheel element is also supported axially against the turbine wheel hub 32 by another support area 70, which has, for example, a plurality of fluid flow channels 72. The inside radial area of the external freewheel element 66 is stiffened by a plurality of stiffening ribs 77, which extend essentially between an area 78 proceeding approximately in an outward radial direction and a cylindrical area 79, which is supported axially and radially against the freewheel element 58 and carries the support section 68.

Figure 2:
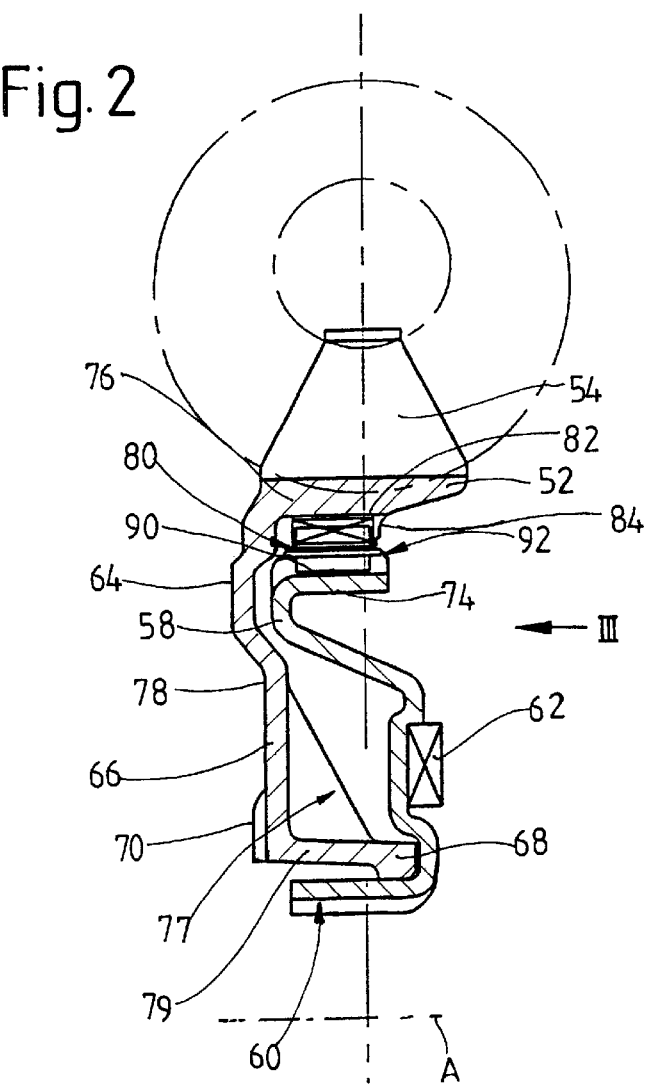
FIG. 2 shows a detailed view of the stator in conjunction with the freewheel unit.

The internal freewheel element 58 and the external freewheel element 66, that is, the body area 64 of the stator 52, have respective internal and external connecting sections 74, 76, which face each other in the radial direction, across which the blocking effect against the rotation of the stator 52 in one direction around the rotational axis A is produced in the manner to be described further below. For this purpose, reference is made in the following to FIGS. 2 and 3, which give the relevant details on an enlarged scale.

An essentially cylindrical locking element carrier 80 made out of sheet metal, for example, is installed in the intermediate radial space between the sections 74, 76. This carrier preferably extends continuously in the circumferential direction as a closed, cylindrical ring-shaped element around the rotational axis A. A plurality of first locking elements 82, which follow each other in a row in the circumferential direction, is provided on the locking element carrier 80. These elements can be produced, for example, by cutting U-shaped slots in the locking element carrier 80 and by bending the tongue-like elements thus formed radially outward. In the section 76 of the stator 52, i.e., in the external freewheel element 66, a plurality of blocking notches or blocking depressions 84 is provided, following each other in a row in the circumferential direction, each of which has a blocking surface 86 facing in the circumferential direction. That a surface "faces in a certain direction" means here that, for example, a vector perpendicular to the surface points in the indicated direction. Adjoining each of these blocking surfaces 86 is a transition region 88, which leads gradually from the outside radial area of the blocking surfaces 86 to the level of the inside radial area, whereas the blocking surfaces 86 themselves represent an approximately radial discontinuity in the circumferential surface contour. It can be seen that, given the appropriate relative positioning between the locking element carrier 80 and the section 66 of the external freewheel element 66, each first locking element 82 will engage in a corresponding recess 84 and come to rest against its assigned blocking surface 86.

Second locking elements 90 are provided on the locking element carrier 80 between the first locking elements 82. The second locking elements 90 can also be formed by cutting U-shaped slots, for example, and by bending the resulting tongues radially toward the inside. A plurality of depressions or recesses 92 is provided in the internal freewheel element 58, i.e., in section 74 thereof, these depressions again providing blocking surfaces 94, which now, however, are directed in the circumferential direction opposite that of the blocking surfaces 86 on external connecting section 76. Here, too, a transition region 96 leads radially toward the outside as far as the level of the outer radial area of the blocking surfaces 94. The second locking elements 90 are positioned in such a way that they can engage with the depressions 92, which can be formed on the internal freewheel element 58 by, for example, a suitable metal-forming process. The free ends of the second locking elements 90 come to rest against their assigned blocking surfaces 94. In addition, as indicated at 98, the locking element carrier 80 can be fixed in position at a minimum of one, and preferably at several, positions on the internal freewheel element 58 by the use of, for example, a forming, peening, or welding process, where, as a result, this fixation serves at least to prevent relative circumferential movement between the locking element carrier 80 and the internal freewheel element 58, but which preferably also serves to fix these two components axially in place.

Figure 3:
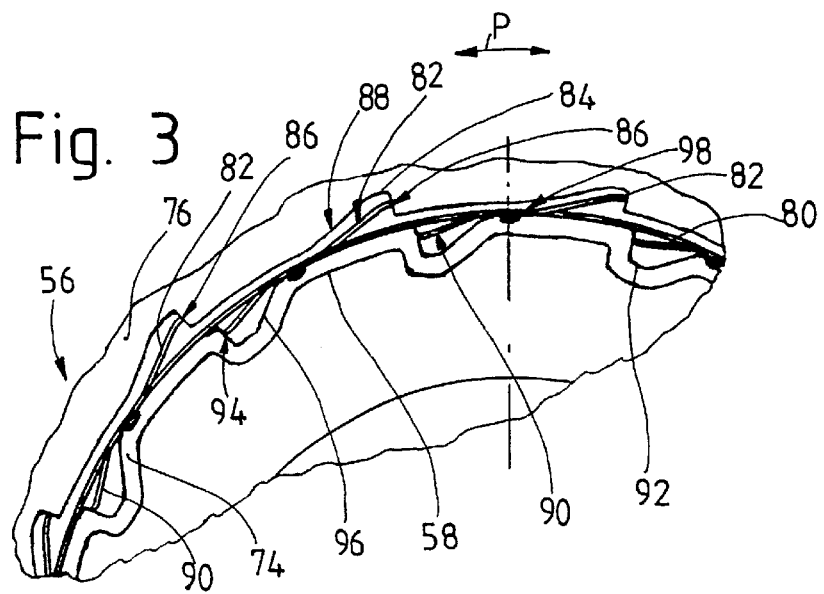
FIG. 3 shows a partial axial view of the freewheel unit shown in FIG. 2 in viewing direction III of FIG. 2.

Referring also to FIG. 3, when a force is exerted on the external freewheel element 66 in the direction of the arrow P, the stator 52 can rotate essentially unhindered with respect to the internal freewheel element 58, because the radially outward-projecting first locking elements 82 slide along the transition regions 88 or are deformed by them, i.e., bent inward opposite their elastic pretension, until they are able to snap into the next depression 84. When, however, a force oriented in the direction opposite direction P is exerted on the stator 52, then the first locking elements 82 arrive in the position shown in FIG. 3, in which they come up against their assigned blocking surfaces 86, which has the effect of preventing any relative rotation of the section 76 with respect to the locking element carrier 80. Because simultaneously the locking element carrier 80 is also prevented from rotating in common with the section 76 in the direction opposite that of the arrow P by the second locking elements 90, which are braced against the blocking surfaces 94, the stator 52 is thus blocked from rotating in the direction opposite that of the arrow P.

It can be seen from the description provided above that the freewheel unit 56 according to the invention is extremely simple in design, because the appropriate depressions are formed on the external freewheel element 66 and on the internal freewheel element 58, and because, furthermore, a single component, namely, the locking element carrier 80, which is made of sheet metal together with the first and second locking elements 82, 90 as an integral part by stamping, for example, is introduced into the intermediate radial space between the two sections 74, 76; that is, before the external freewheel element 66 is assembled with the internal freewheel element 58, the locking element carrier is fixed in position on the internal freewheel element 58, whereupon the assembly consisting of the internal freewheel unit and the locking element carrier are moved onto the external freewheel element 66.

The locking element carrier 80 can, for example, be made out of a strip of sheet metal. After this strip has been bent into a cylindrical form, the ends are joined by riveting or soldering to form a cylindrical ring. It should also be pointed out that the locking element carrier 80 could obviously be fixed in position with respect to the external freewheel element 66. In addition, it should be pointed out that, with respect to the capacity to transfer force, it is preferable to provide both first and second locking elements 82, 90, the first to interact with the external freewheel element 66 in locking fashion, the second to interact with the internal freewheel element 58 in locking fashion. But it also equally possible to provide, for example, only the first locking elements 82 and to establish the permanent connection with the internal freewheel element 58 by welding or stamping.

It should also be mentioned that, in the area of the support section 68, it is possible to install, for example, a bearing material on one of the elements 58, 66. At least one of these components, preferably the external freewheel element 66, can also be produced out of a material which slides easily, this component also being supported by the support section 70 in a sliding manner on the turbine wheel hub 32.

Figure 4:
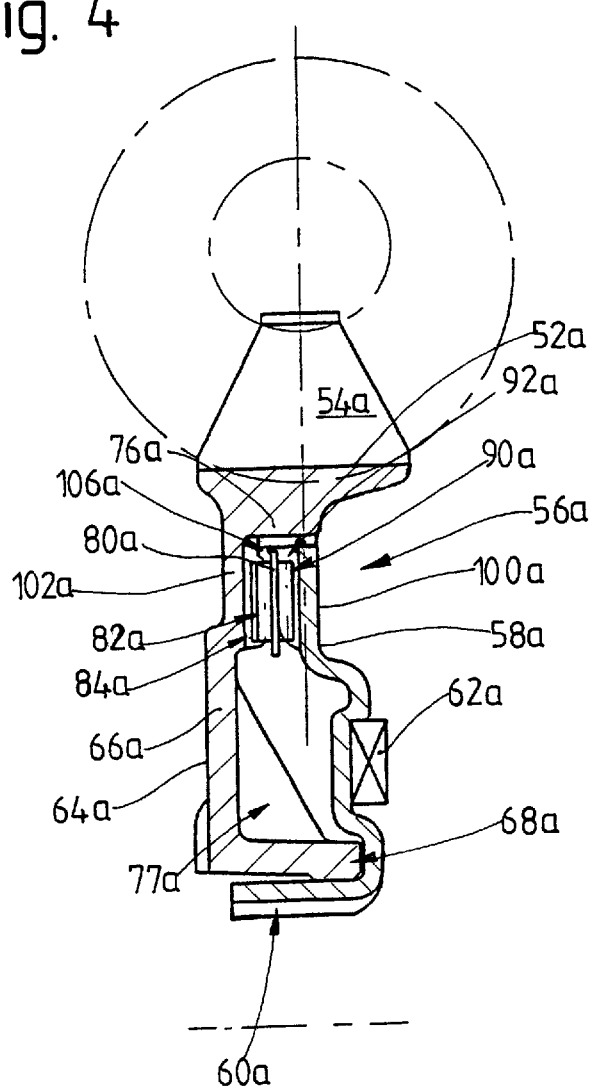
FIG. 4 shows an alternative design in a view corresponding to that of FIG. 2.
Figure 5:
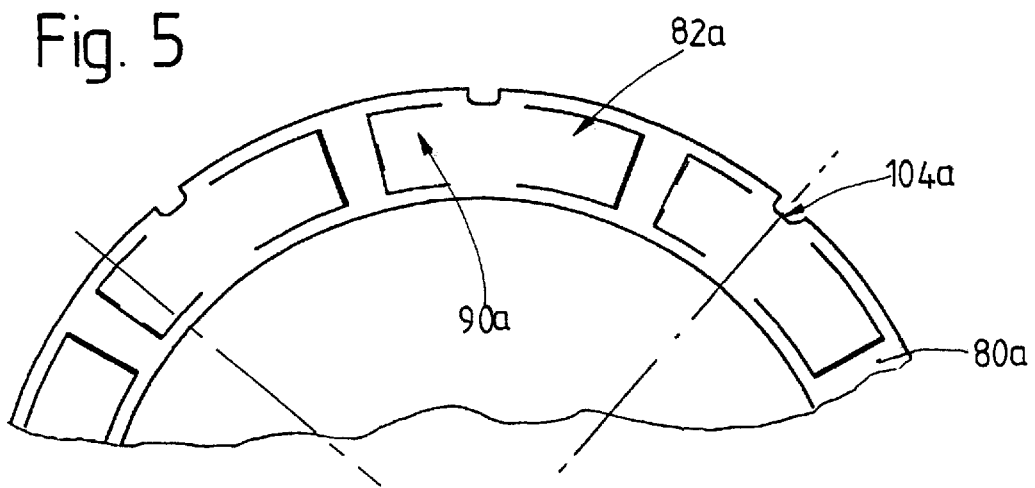
FIG. 5 shows an axial view of the locking element carrier used in the design variant according to FIG. 4 and of the locking elements provided thereon.

FIGS. 4 and 5 show an alternative embodiment of the freewheel unit according to the invention. Components which are the same as the components described above with respect to their design and/or function carry the same reference number with an added "a".

In the case of the embodiment shown in FIGS. 4 and 5, the locking element carrier 80a is designed as an element in the form of ring-shaped disk, and the first and second locking elements 82a, 90a are now designed as extending in opposite axial directions and obviously also in opposite circumferential directions. In a corresponding manner, the internal freewheel element 58a and the external freewheel element 66a now have sections 100a, 102a which are opposite each other in the axial direction and in which the depressions 92a, 84a have been produced by stamping. These depression are now open in the axial direction, however, so that the locking elements 82a, 90a projecting axially from the locking element carrier 80a can engage axially with the depressions 92a, 84a. In addition, it can be seen that a plurality of notches 104a has been formed on the locking element carrier 80a, with which the internal freewheel element 58a can engage by its associated connecting projections 106a, which engage in the radially inward direction, in order to establish in this case as well a nonrotatable connection between the locking element carrier 80a and the internal freewheel element 58a. In this embodiment, the blocking surfaces (not visible in the figures) are also situated in such a way that they face in opposite directions; that is, their free surfaces point in opposite circumferential directions, so that they can interact with their associated locking elements 82a, 90a. So that, in this embodiment, the axial thrust on the stator can be absorbed effectively, especially in the locking mode of the freewheel unit 56a, an additional axial support element can be provided, which acts between the two elements 66a, 58a.

As a result of the present invention, a freewheel unit is provided which can be produced very easily, in particular because the individual locking elements are no longer designed as separate pawls, which must be fabricated with high precision; on the contrary, the can be produced ultimately as integral parts of a locking element carrier, made out of a sheet of spring steel. This simplifies both the process of producing the locking elements themselves and the process of assembling a hydrodynamic torque converter incorporating an arrangement of type.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A freewheel unit for a stator in a hydrodynamic torque converter, said freewheel unit comprising a first freewheel element and a second freewheel element arranged to rotate relative to each other about a common axis of rotation, and means for allowing said elements to rotate relative to each other essentially in only one direction, said means comprising at least one first blocking surface on said first freewheel element, at least one second blocking surface on said second freewheel element, a locking element carrier arranged coaxially between said first and second freewheel elements, said locking element carrier having a first side and a second side facing respective said first and second freewheel elements, at least one first locking element on said first side, facing in a first circumferential direction, and engageable against said at least one first blocking surface to prevent relative rotation between said first freewheel element and said locking element carrier in one direction of relative rotation, and at least one second locking element on said second side of said locking element carrier, facing in a second circumferential direction opposite to said first circumferential direction, and engageable against said at least one second blocking surface to prevent relative rotation between said second freewheel element and said locking element carrier in one direction of relative rotation, wherein said locking element carrier and said locking elements are formed integrally of sheet metal.

2. A freewheel unit as in claim 1 wherein said at least one first blocking surface and said at least one second blocking surface face in opposite circumferential directions, said at least one first locking element being engageable against said at least one first blocking surface to prevent relative rotation between said first freewheel element and said locking element carrier in said first circumferential direction, said at least one second locking element being engageable against said at least one second blocking surface to prevent relative rotation between said second freewheel element and said locking element carrier in said second circumferential direction.

3. A freewheel unit as in claim 1 wherein said at least one first locking element and said at least one second locking element alternate with each other circumferentially about the locking element carrier.

4. A freewheel unit as in claim 1 wherein one of said locking elements is fixed with respect to one of said first and second freewheel elements.

5. A freewheel unit as in claim 1 wherein said locking element carrier is essentially in the form of a ring.

6. A freewheel unit as in claim 1 wherein said locking element carrier is essentially in the form of a cylindrical ring, said at least one first locking element extending radially outward toward said first freewheel element, said at least one second locking element extending radially inward toward said second freewheel element.

7. A freewheel unit as in claim 1 wherein said locking element carrier is essentially in the form of an annular disc, said at least one first locking element extending axially toward said first freewheel element, said at least one second locking element extending axially toward said second freewheel element.

8. A freewheel unit as in claim 1 wherein said first and second locking elements are bent away from the locking element carrier toward the first and second sides, respectively.

9. A hydrodynamic torque converter having a freewheel unit comprising a first freewheel element having a radially outer area supporting a plurality of stator vanes, a second freewheel element which is axially spaced from said first freewheel element and which is nonrotatably supported with respect to a support element, and means for allowing said elements to rotate relative to each other essentially in only one direction, said means comprising at least one first blocking surface on said first freewheel element, at least one second blocking surface on said second freewheel element, a locking element carrier arranged coaxially between said first and second freewheel elements, said locking element carrier having a first side and a second side axially facing respective said first and second freewheel elements, at least one first locking element on said first side, facing in a first circumferential direction, extending axially toward said first freewheel element, and engageable against said at least one first blocking surface to prevent relative rotation between said first freewheel element and said locking element carrier in one direction of relative rotation, and at least one second locking element on said second side of said locking element carrier, facing in a second circumferential direction opposite to said first circumferential direction, extending axially toward said second freewheel element, and engageable against said at least one second blocking surface to prevent relative rotation between said second freewheel element and said locking element carrier in said second circumferential direction.

10. A hydrodynamic torque converter as in claim 9 wherein said locking element carrier and said locking elements are formed integrally of sheet metal.

11. A hydrodynamic torque converter as in claim 9 wherein said at least one first locking element and said at least one second locking element alternate with each other circumferentially about the locking element carrier.

* * * * *